United States Patent
Lee

(10) Patent No.: US 9,718,500 B2
(45) Date of Patent: Aug. 1, 2017

(54) STRUCTURE OF HYBRID FRONT PILLAR

(71) Applicant: Hyundai Motor Company, Seoul (KR)

(72) Inventor: Shang-Ill Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/090,045

(22) Filed: Apr. 4, 2016

(65) Prior Publication Data

US 2017/0113732 A1    Apr. 27, 2017

(30) Foreign Application Priority Data

Oct. 23, 2015    (KR) .......... 10-2015-0147999

(51) Int. Cl.
*B62D 25/04*    (2006.01)
*B62D 29/00*    (2006.01)
*B62D 27/02*    (2006.01)

(52) U.S. Cl.
CPC ............. *B62D 25/04* (2013.01); *B62D 27/02* (2013.01); *B62D 29/00* (2013.01)

(58) Field of Classification Search
CPC .................................................. B62D 25/04
USPC ....... 296/187.12, 193.06, 193.05, 203.03, 29
See application file for complete search history.

(56) References Cited

U.S. PATENT DOCUMENTS

| | | | | |
|---|---|---|---|---|
| 4,618,163 A * | 10/1986 | Hasler | .................. | B62D 23/005 280/785 |
| 5,269,585 A * | 12/1993 | Klages | ................. | B62D 29/008 296/201 |
| 5,332,277 A * | 7/1994 | Enning | ................ | B62D 29/008 296/192 |
| 7,322,106 B2 * | 1/2008 | Marando | ............. | B22D 19/045 29/507 |
| 2006/0175871 A1 * | 8/2006 | Eipper | ................... | B62D 25/04 296/193.04 |
| 2007/0063546 A1 * | 3/2007 | Lassl | .................. | B62D 25/2036 296/193.06 |
| 2008/0169682 A1 * | 7/2008 | Hedderly | ............... | B62D 25/08 296/193.08 |

(Continued)

FOREIGN PATENT DOCUMENTS

| | | |
|---|---|---|
| EP | 2684779 A1 | 1/2014 |
| JP | 2003-127898 A | 5/2003 |

(Continued)

*Primary Examiner* — Jason S Morrow
(74) *Attorney, Agent, or Firm* — Mintz Levin Cohn Ferris Glovsky and Popeo, P.C.; Peter F. Corless

(57) ABSTRACT

A structure of a hybrid front pillar of a vehicle includes a front pillar lower portion which is disposed at a front side of a front door unit of a vehicle, and has a lower end coupled to a side connecting member; and a front pillar upper portion which is disposed at an upper side of the front pillar lower portion, and coupled to the front pillar lower portion, in which a recessed portion is formed at one side of the side connecting member such that the lower end of the front pillar lower portion is inserted into the recessed portion, and a mounting portion is formed at a lower end of the front pillar upper portion such that an upper end of the front pillar lower portion is inserted into the mounting portion, thereby significantly reducing a weight of the vehicle body, enhancing rigidity of the front pillar, and omitting reinforcing components.

4 Claims, 9 Drawing Sheets

(56) References Cited

U.S. PATENT DOCUMENTS

2014/0300126 A1* 10/2014 Ehrlich .................. B62D 27/02
                                                    296/29
2015/0042126 A1    2/2015 Matsuda et al.
2015/0375800 A1* 12/2015 Wagner ................ B62D 29/046
                                                    296/187.03

FOREIGN PATENT DOCUMENTS

| JP | 2013-193637 A    | 9/2013  |
|----|------------------|---------|
| JP | 05-305878 B2     | 10/2013 |
| JP | 2014-091462 A    | 5/2014  |
| KR | 10-2014-0075482 A | 6/2014 |

* cited by examiner

STRUCTURE OF HYBRID FRONT PILLAR

CROSS-REFERENCE TO RELATED APPLICATION

This application claims under 35 U.S.C. §119(a) the benefit of Korean Patent Application No. 10-2015-0147999, filed on Oct. 23, 2015 in the Korean Intellectual Property Office, the entire contents of which are incorporated by reference herein.

BACKGROUND

1. Technical Field

The present invention relates to a structure of a front pillar for a vehicle, and more particularly, to a structure of a hybrid front pillar, which is capable of reducing a weight of the front pillar and a number of components by utilizing aluminum die casting, aluminum extrusion, or CFRP, and which can increase rigidity, for example, to withstand damage in a small overlap collision test, by utilizing a mutual insertion structure and a mechanical connection method.

2. Description of the Related Art

In general, a vehicle is broadly divided into a vehicle body and a chassis. The vehicle body refers to a portion that defines an external shape of the vehicle, and the chassis refers to a portion in which mechanical devices, which are required to drive the vehicle, are installed.

Pillars, which support front doors and rear doors, define the entire shape of the vehicle body, and maintain rigidity of lateral side portions of the vehicle body, are fastened at outer peripheral portions of the front doors and the rear doors which are disposed at both sides of the vehicle body.

The pillars are broadly divided into a front pillar which abuts on a rear end of an engine room at a front side of the vehicle body, and is disposed in a front and rear direction of the vehicle while being inclined at a predetermined angle so as to support the front door, a center pillar which is disposed in an up and down direction between the front door and the rear door, and supports the front door, the rear door, and lateral portions of the vehicle body which are opened by the doors, and a rear pillar which is coupled to a rear end of the rear door, and supports the rear door and a rear side of the vehicle body.

In particular, to promote safety of vehicle occupants, research has been conducted on reinforcing lateral portions of the vehicle body which are relatively vulnerable to external impact, and research also has been conducted to improve rigidity of the vehicle body for purposes of a small overlap collision test that is carried out by allowing 25% of a front portion of the vehicle body of the vehicle, which travels at a predetermined or higher speed, to collide with a stationary obstacle.

FIG. 1 (RELATED ART) is a view of a structure of a front pillar for a vehicle in the related art when viewed from the outside of the vehicle body.

As illustrated in FIG. 1, the front pillar in the related art includes a front pillar lower portion 1 disposed at a front side of a front door unit 4 of the vehicle, and a front pillar upper portion 2 disposed at an upper side of the front pillar lower portion 1, and supports the front door unit.

However, in the case of the front pillar in the related art, a plurality of reinforcing components 3 is coupled to the front pillar in order to improve rigidity of the lateral side portion of the vehicle, particularly, for purposes of a small overlap collision test, and as a result, there are problems in that the overall number of components and a weight of the vehicle body are increased.

In the case of the front pillar in the related art, both of the front pillar lower portion 1 and the front pillar upper portion 2 are made of a steel plate and are connected to each other by being bonded by simple matching, and as a result, there is a problem in that connectivity deteriorates.

The above information disclosed in this Background section is only for enhancement of understanding of the background of the invention, and therefore it should not be understood that the above information is regarded as being the prior art that has been already known to those skilled in the art.

SUMMARY

The present invention provides a structure of a hybrid front pillar, which can significantly reduce a weight of a vehicle body by manufacturing a front pillar lower portion using extruded aluminum, manufacturing a front pillar upper portion using die casted aluminum, and using a side reinforcing member made of a CFRP material.

The present invention also provides a structure of a hybrid front pillar, which is capable of improving rigidity of a front pillar and omitting reinforcing components by connecting a front pillar lower portion, a front pillar upper portion, and a side connecting member using a structure in which the front pillar lower portion, the front pillar upper portion, and the side connecting member are inserted into each other.

Technical problems to be solved by the present invention are not limited to the aforementioned technical problems, and other technical problems, which are not mentioned above, may be clearly understood from the following descriptions by those skilled in the art to which the present invention pertains.

An exemplary embodiment of the present invention provides a structure of a hybrid front pillar including: a front pillar lower portion which is disposed at a front side of a front door unit of a vehicle, and has a lower end coupled to a side connecting member; and a front pillar upper portion which is disposed at an upper side of the front pillar lower portion, and coupled to the front pillar lower portion, in which a recessed portion is formed at one side of the side connecting member such that the lower end of the front pillar lower portion is inserted into the recessed portion, and a mounting portion is formed at a lower end of the front pillar upper portion such that an upper end of the front pillar lower portion is inserted into the mounting portion.

The structure of a hybrid front pillar according to the exemplary embodiment of the present invention may further include a side reinforcing member which is coupled to a lateral side portion of the side connecting member, and has an end disposed adjacent to the recessed portion.

In the structure of a hybrid front pillar according to the exemplary embodiment of the present invention, the front pillar lower portion may be made of extruded aluminum, and the front pillar upper portion and the side connecting member may be made of die cast aluminum.

In the structure of a hybrid front pillar according to the exemplary embodiment of the present invention, the side reinforcing member may be made of a carbon fiber reinforced plastic (CFRP) material.

In the structure of a hybrid front pillar according to the exemplary embodiment of the present invention, a lower rib may be formed in the front pillar lower portion, and a grid-shaped upper rib may be formed on one surface of the front pillar upper portion.

In the structure of a hybrid front pillar according to the exemplary embodiment of the present invention, the lower end portion of the front pillar lower portion, which is inserted into the recessed portion of the side connecting member, may be attached by a structural adhesive, and coupled by a tack rivet and a semi-self-piercing rivet (SPR), and an upper end portion of the front pillar lower portion, which is inserted into the mounting portion of the front pillar upper portion, may be attached by a structural adhesive, and coupled by a tack rivet.

The present invention, which has the aforementioned configurations, may significantly reduce a weight of the front pillar by using lightweight composite materials for the front pillar of the vehicle. Specifically, a weight of the front pillar according to the present invention may be reduced by about 20 kg compared to the related art.

That is, the present invention may significantly reduce a weight of the vehicle body by manufacturing the front pillar lower portion using extruded aluminum, manufacturing the front pillar upper portion using die cast aluminum, and using the side reinforcing member made of a CFRP material.

The present invention may reduce a weight of the vehicle body and ensure rigidity similar to or higher than that in the related art by connecting the front pillar lower portion, the front pillar upper portion, and the side connecting member using a structure in which the front pillar lower portion, the front pillar upper portion, and the side connecting member are inserted into each other.

That is, in the case of the front pillar according to the present invention, with the effect of ensuring rigidity, it is possible to significantly reduce the number of reinforcing components compared to the related art, and as a result, work processes may be quickly carried out, and the number of work processes may be reduced.

As a result, the present invention may ensure rigidity of the vehicle body and reduce a weight of the vehicle body, thereby improving safety and fuel efficiency of the vehicle, and thus increasing marketability of the vehicle.

DETAILED DESCRIPTION OF THE EMBODIMENTS

Figure 1:
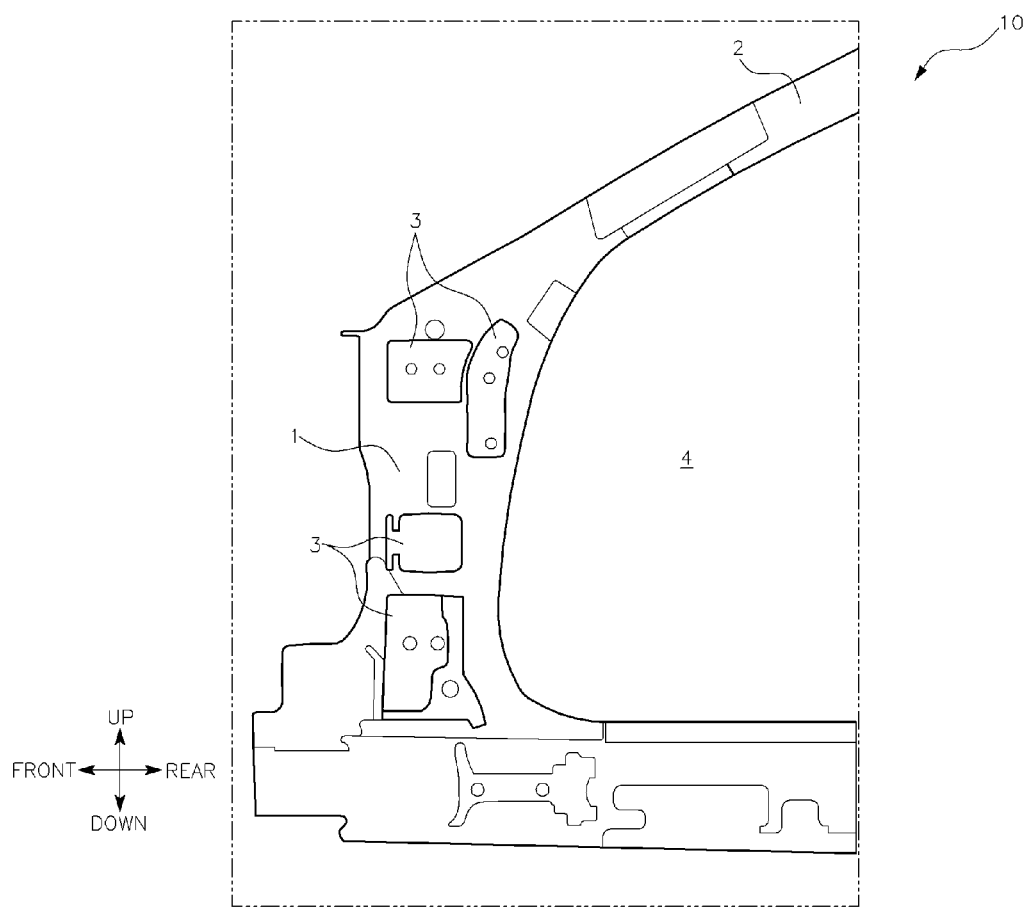
FIG. 1 (RELATED ART) is a view illustrating an appearance of a structure of a front pillar for a vehicle in the related art when viewed from the outside of the vehicle body.

Hereinafter, the present invention will be described in detail with reference to the accompanying drawings so that those skilled in the technical field to which the present invention pertains may easily carry out the present invention. However, the present invention may be implemented in various different ways, and is not limited to the exemplary embodiment described herein.

A part irrelevant to the description will be omitted to clearly describe the present invention, and the same or similar constituent elements will be designated by the same reference numerals throughout the specification.

Terms or words used in the specification and the claims should not be interpreted as being limited to a general and dictionary meaning and should be interpreted as a meaning and a concept which conform to the technical spirit of the present invention based on a principle that an inventor can appropriately define a concept of a term in order to describe his/her own invention by the best method.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 2:
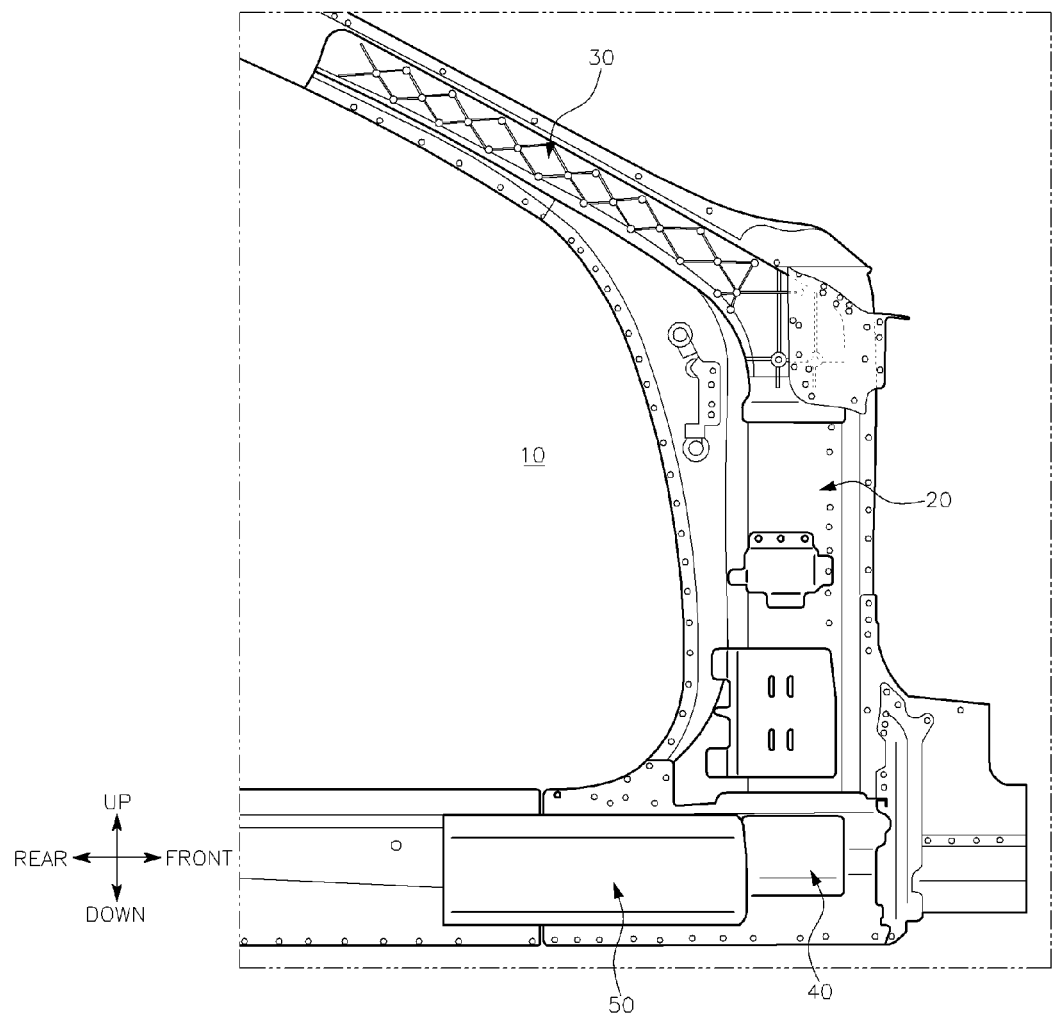
FIG. 2 is a sectional view of a hybrid front pillar according to an exemplary embodiment of the present invention when viewed from the inside of a vehicle body.

FIG. 2 is a sectional view of a structure of a hybrid front pillar according to an exemplary embodiment of the present invention when viewed from the inside of a vehicle body, and FIGS. 3 to 6 are perspective views illustrating respective components of the structure of the hybrid front pillar according to the exemplary embodiment of the present invention.

As illustrated, the structure of the hybrid front pillar according to the present invention may include a front pillar lower portion 20, a front pillar upper portion 30, a side connecting member 40, and a side reinforcing member 50.

Figure 3:
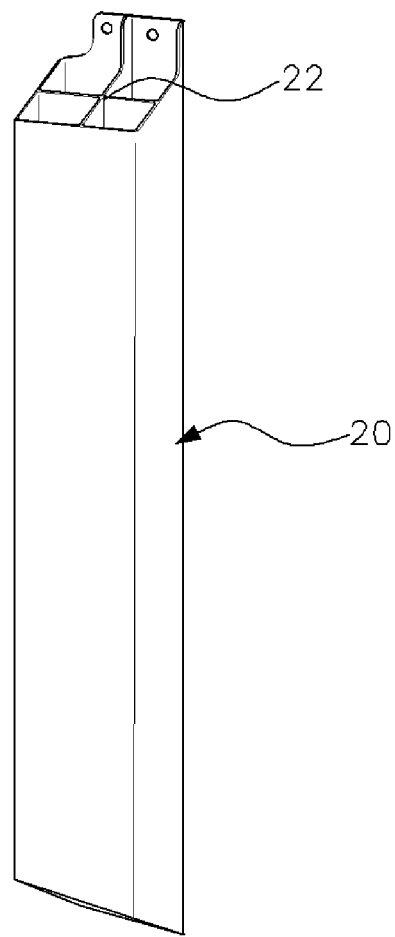
FIG. 3 is a perspective view of a front pillar lower portion according to the exemplary embodiment of the present invention.

Specifically, as illustrated in FIGS. 2 and 3, the front pillar lower portion 20 preferably is a straight beam disposed in an up and down direction at a front side of a front door unit 10 of a vehicle, and a lower end of the front pillar lower portion 20 is coupled to the side connecting member 40.

Unlike the related art, the front pillar lower portion 20 of the present invention preferably is manufactured by extruding aluminum, and a '+'-shaped lower rib 22 is formed in the front pillar lower portion 20 to enhance rigidity of the front pillar lower portion.

That is, the front pillar lower portion 20 is produced in a manner in which an aluminum material is put into an extrusion container, and then a ram is moved and withdrawn with strong force, and a thickness of the front pillar lower portion 20 may be about 2.5 mm.

Figure 4:
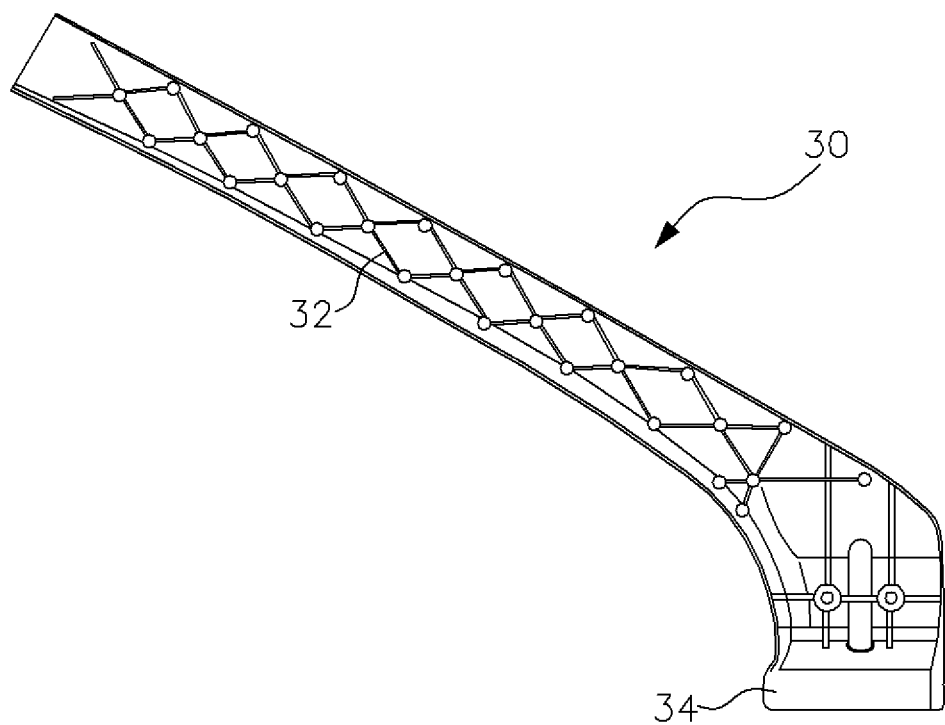
FIG. 4 is a perspective view of a front pillar upper portion according to the exemplary embodiment of the present invention.

As illustrated in FIGS. 2 and 4, the front pillar upper portion 30 is disposed at an upper side of the front pillar lower portion 20, and formed to be inclined at a predetermined angle in accordance with a shape of a door of the vehicle.

The front pillar upper portion 30 is manufactured by die casting of an aluminum material, and an 'X' grid-shaped upper rib 32 is formed on one surface (inner surface in the illustrated exemplary embodiment) of the front pillar upper portion 30 to enhance rigidity of the front pillar upper portion. A thickness of the front pillar upper portion 30 may be about 3.0 mm.

As described herein, die casting refers to a precision casting method of obtaining a casting identical to a die by pouring molten metal into the die which is made of steel and accurately machined so as to be completely identical to the shape of the required casting. This casting method ensures an accurate dimension, and has an advantage in that almost no machining is required, products with excellent mechanical characteristics are manufactured, and mass production is enabled.

Meanwhile, a mounting portion 34, which has a quadrangular flange shape, is formed at a lower end portion of the front pillar upper portion 30, and the mounting portion 34 serves to provide a space into which an upper end of the front pillar lower portion 20 is inserted.

Figure 5:
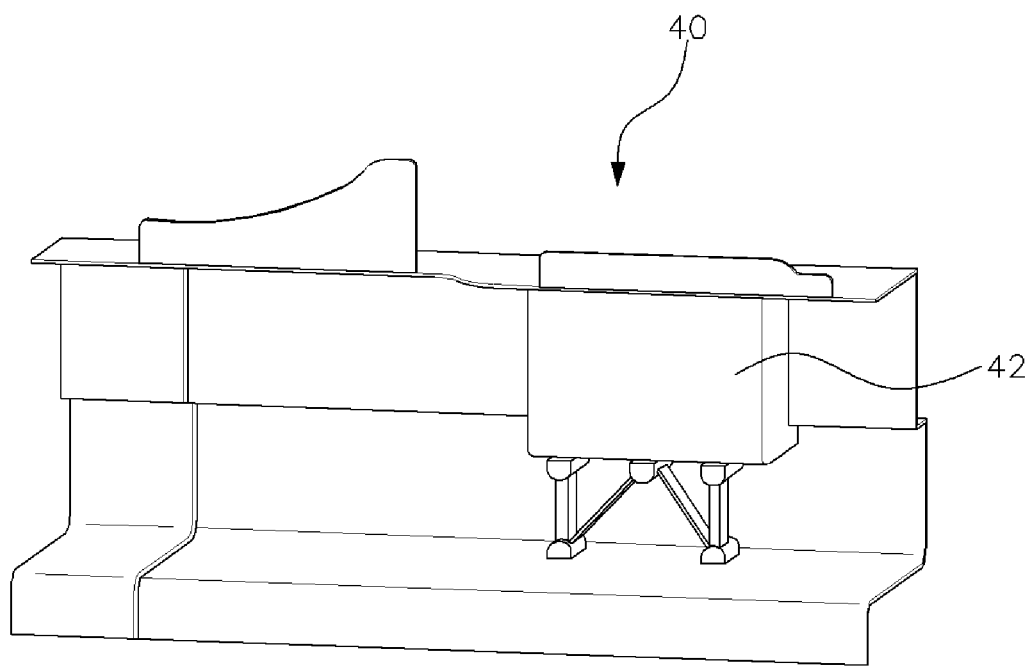
FIG. 5 is a perspective view of a side connecting member according to the exemplary embodiment of the present invention.

As illustrated in FIGS. 2 and 5, the side connecting member 40 is disposed at a lower side of the front pillar lower portion 20 in a front and rear direction of the vehicle, and a recessed portion 42 is formed at one side of the side connecting member 40 so as to provide a space into which a lower end of the front pillar lower portion 20 may be inserted.

Similar to the front pillar upper portion 30, the side connecting member 40 is manufactured by die casting of an aluminum material, and a thickness of the side connecting member 40 may be about 3.0 mm.

Figure 6:
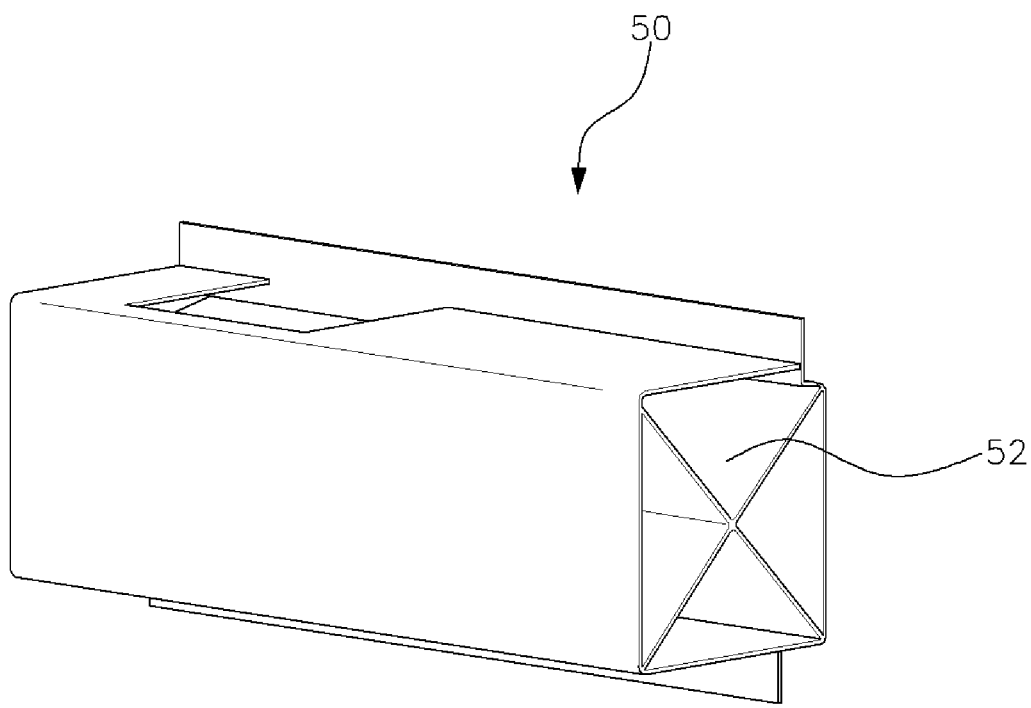
FIG. 6 is a perspective view of a side reinforcing member according to the exemplary embodiment of the present invention.

As illustrated in FIGS. 2 and 6, the side reinforcing member 50 is formed in a beam shape, and coupled to a lateral side portion of the side connecting member 40, and in this case, an end (front end in the illustrated exemplary embodiment) of the side reinforcing member 50 is disposed to be adjacent to or in contact with the recessed portion 42.

The side reinforcing member 50 is made of a carbon fiber reinforced plastic (CFRP) material, and an 'X'-shaped reinforcing rib 52 is formed in the side reinforcing member 50 to enhance rigidity of the side reinforcing member.

Here, the carbon fiber reinforced plastic (CFRP) material refers to a high-strength and high-elasticity lightweight structural material which is made by using carbon fiber as a reinforcing material, and has excellent specific strength, specific modulus, fatigue characteristics, and wear resistance, such that the carbon fiber reinforced plastic material is utilized in various fields.

Figure 7:
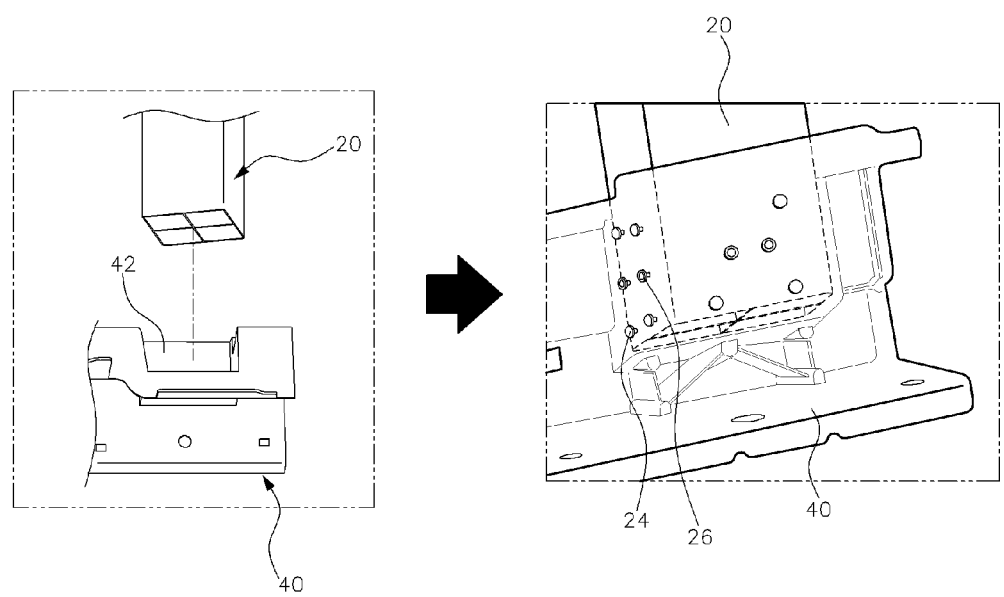
FIG. 7 is a view illustrating a process of coupling the front pillar lower portion and the side connecting member according to the exemplary embodiment of the present invention.
Figure 8:
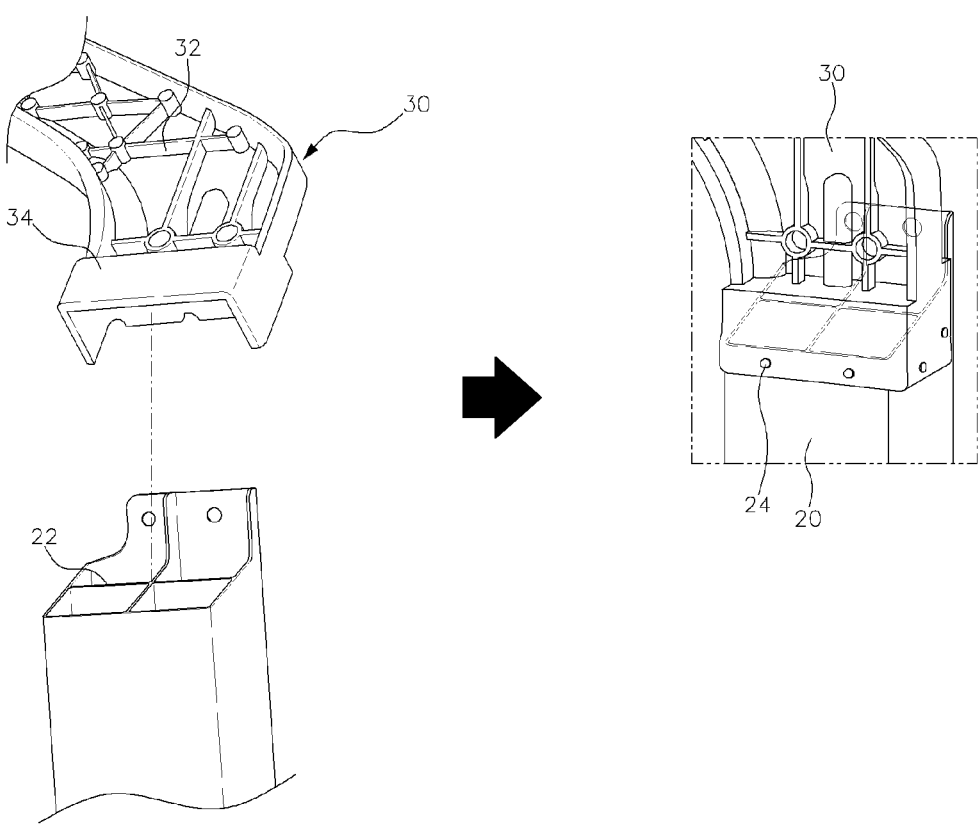
FIG. 8 is a view illustrating a process of coupling the front pillar upper portion and the front pillar lower portion according to the exemplary embodiment of the present invention.
Figure 9:
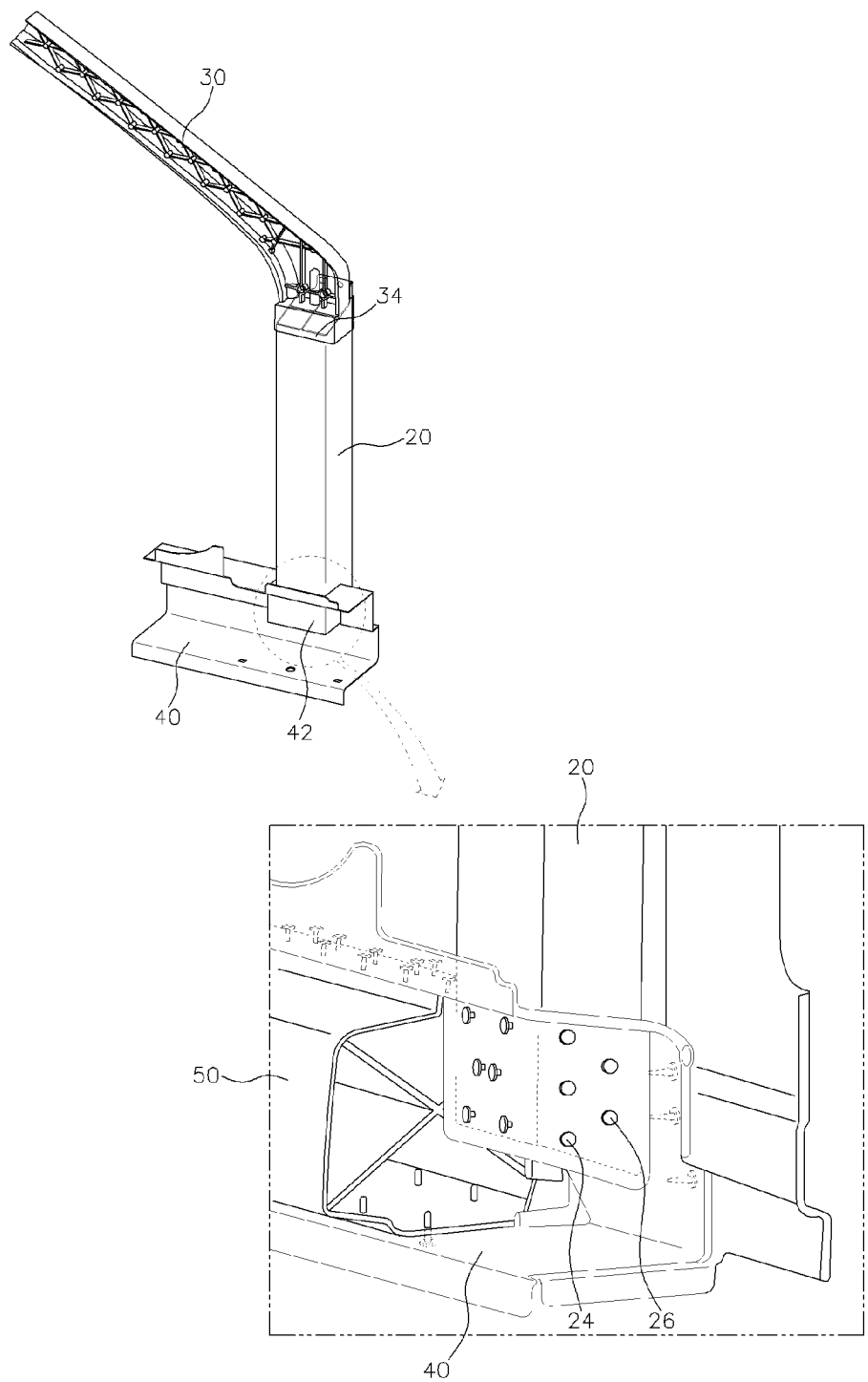
FIG. 9 is a view in which the front pillar upper portion, the front pillar lower portion, and the side connecting member according to the exemplary embodiment of the present invention are coupled.

FIG. 7 is a view illustrating a process of coupling the front pillar lower portion and the side connecting member according to the exemplary embodiment of the present invention, FIG. 8 is a view illustrating a process of coupling the front pillar upper portion and the front pillar lower portion according to the exemplary embodiment of the present invention, and FIG. 9 is a view in which the front pillar upper portion, the front pillar lower portion, and the side connecting member according to the exemplary embodiment of the present invention are coupled.

As illustrated in FIG. 7, the lower end of the front pillar lower portion 20 is inserted into and coupled to the recessed portion 42 formed in the side connecting member 40, and the recessed portion 42 has a shape that engages with the lower end of the front pillar lower portion 20.

In this case, as illustrated in FIG. 9, the lower end portion of the front pillar lower portion 20, which is inserted into the recessed portion 42 of the side connecting member 40, is attached and fixed by a structural adhesive (not illustrated), and then coupled by tack rivets 24 and semi-self-piercing rivets (SPR) 26.

The coupling between the front pillar lower portion 20 and the side connecting member 40 according to the present invention may be implemented by utilizing all of the insertion, the structural adhesive, and the mechanical bonding, and as the structural adhesive, a polymer alloy type adhesive or a polyimide type adhesive is used.

In this case, the tack rivet 24 is used for a mechanical bonding method of fastening two or more plates or closed cross sections, and a pointed end of the tack rivet 24 is inserted into the plates to fasten the plates.

Here, the semi-self-piercing rivet (SPR) 26 is used for a mechanical bonding method of fastening two or more plates or closed cross sections, and forms matching part holes in the two or more plates to bond the plates in a one side manner, and because the semi-self-piercing rivet (SPR) 26 may maintain stable strength without variables and factors, the semi-self-piercing rivet (SPR) 26 is used to bond various plates.

As illustrated in FIG. 8, the upper end of the front pillar lower portion 20 is inserted into and coupled to the mounting portion 34 formed on the front pillar upper portion 30, and an upper end portion of the front pillar lower portion 20 may be attached and fixed by the structural adhesive and then coupled by the tack rivets 24.

That is, the coupling between the front pillar lower portion 20 and the front pillar upper portion 30 according to the present invention is also implemented by utilizing all of the insertion, the structural adhesive, and the mechanical bonding, and thus has a structure for maximizing connection rigidity.

As described above, according to the structure of the hybrid front pillar according to the present invention, the front pillar lower portion 20, the front pillar upper portion 30, the side connecting member 40, and the side reinforcing member 50 are made of aluminum or CFRP materials, thereby reducing a weight of the vehicle body, and ensuring the existing rigidity or higher rigidity by using an insertion structure and the mechanical bonding.

The present invention, which has been described above, is not limited by the aforementioned exemplary embodiment and the accompanying drawings, and it is obvious to those skilled in the art to which the present invention pertains that various substitutions, modifications and alterations may be made without departing from the technical spirit of the present invention.

What is claimed is:

1. A structure of a hybrid front pillar, comprising:
a front pillar lower portion which is disposed at a front side of a front door unit of a vehicle, and has a lower end coupled to a side connecting member;
a front pillar upper portion which is disposed at an upper side of the front pillar lower portion, and coupled to the front pillar lower portion; and
a side reinforcing member which is coupled to a lateral side portion of the side connecting member,
wherein a recessed portion is formed at one side of the side connecting member such that the lower end of the front pillar lower portion is inserted into the recessed portion, and a mounting portion is formed at a lower end of the front pillar upper portion such that an upper end of the front pillar lower portion is inserted into the mounting portion, and the side reinforcing member has an end disposed adjacent to the recessed portion,
wherein the side reinforcing member is made of a carbon fiber reinforced plastic (CFRP) material.

2. The structure of claim 1, wherein the front pillar lower portion is made of extruded aluminum, and the front pillar upper portion and the side connecting member are made of die cast aluminum.

3. The structure of claim 1, wherein a lower rib is formed in the front pillar lower portion, and a grid-shaped upper rib is formed on one surface of the front pillar upper portion.

4. The structure of claim 1, wherein the lower end portion of the front pillar lower portion, which is inserted into the recessed portion of the side connecting member, is attached by a structural adhesive, and coupled by a tack rivet and a semi-self-piercing rivet (SPR), and an upper end portion of the front pillar lower portion, which is inserted into the mounting portion of the front pillar upper portion, is attached by a structural adhesive, and coupled by a tack rivet.

* * * * *